(12) United States Patent
O'Donovan

(10) Patent No.: US 9,736,313 B2
(45) Date of Patent: *Aug. 15, 2017

(54) AUDIO QUALITY IN TELECONFERENCING

(71) Applicant: International Business Machines Corporation, Armonk, NY (US)

(72) Inventor: Brian O'Donovan, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/294,740

(22) Filed: Oct. 16, 2016

(65) Prior Publication Data

US 2017/0034356 A1  Feb. 2, 2017

Related U.S. Application Data

(63) Continuation of application No. 13/570,697, filed on Aug. 9, 2012, now Pat. No. 9,473,645.

(30) Foreign Application Priority Data

Aug. 18, 2011 (EP) ................................. 11177934

(51) Int. Cl.
*H04M 3/42* (2006.01)
*H04M 9/08* (2006.01)
(Continued)

(52) U.S. Cl.
CPC .............. *H04M 3/568* (2013.01); *H04M 9/08* (2013.01); *H04R 3/02* (2013.01); *H04M 2203/50* (2013.01); *H04M 2203/509* (2013.01)

(58) Field of Classification Search
CPC .......................... H04M 3/568; H04M 2203/50
(Continued)

(56) References Cited

U.S. PATENT DOCUMENTS

| 4,449,238 A | 5/1984 | Lee et al. |
| 4,577,309 A | 3/1986 | Barazeche et al. |

(Continued)

FOREIGN PATENT DOCUMENTS

| EP | 0561133 B1 | 9/1993 |
| EP | 1564980 A1 | 8/2005 |

(Continued)

OTHER PUBLICATIONS

Gansler, T. et al., "New Insights Into the Stereophonic Acoustic Echo Cancellation Problem and an Adaptive Nonlinearity Solution" IEEE Trans. on Speech and Audio Processing, vol. 10, No. 5, pp. 257-267, Jul. 2002, retrieved from the Internet: <http://externe.emt.inrs.ca/users/benesty/papers/sap_jul2002.pdf>.

(Continued)

*Primary Examiner* — William Deane, Jr.
(74) *Attorney, Agent, or Firm* — Cuenot, Forsythe & Kim, LLC

(57) ABSTRACT

A method and system for improved audio quality in teleconferencing are provided. The method includes analyzing the audio signal of multiple input lines in a teleconferencing system to detect if any two input lines contain substantially the same audio signal with a delay shorter than that of a conventional echo caused by an input line's own audio feedback via a teleconferencing server. The method further includes selecting the input line with the higher amplitude audio signal or the earlier received audio signal when two input lines with substantially the same audio signal are detected.

18 Claims, 3 Drawing Sheets

(51) Int. Cl.
*H04M 3/56* (2006.01)
*H04R 3/02* (2006.01)

(58) Field of Classification Search
USPC ..... 379/202.01, 158, 388.07, 203.01, 204.01
See application file for complete search history.

(56) References Cited

U.S. PATENT DOCUMENTS

| | | |
|---|---|---|
| 5,454,041 A | 9/1995 | Davis |
| 5,548,642 A | 8/1996 | Diethorn |
| 5,664,021 A | 9/1997 | Chu et al. |
| 5,796,819 A | 8/1998 | Romesburg |
| 6,125,343 A | 9/2000 | Schuster |
| 6,246,760 B1 | 6/2001 | Makino et al. |
| 6,728,221 B1 | 4/2004 | Shaffer et al. |
| 7,058,026 B1 | 6/2006 | Hera et al. |
| 7,233,673 B1 | 6/2007 | Poletti |
| 7,876,890 B2 | 1/2011 | Diethorn |
| 8,126,129 B1 | 2/2012 | McGuire |
| 9,473,645 B2 | 10/2016 | O'Donovan |
| 2003/0138119 A1 | 7/2003 | Pocino et al. |
| 2005/0075131 A1 | 4/2005 | Palan |
| 2005/0254640 A1 | 11/2005 | Ohki et al. |
| 2008/0159178 A1 | 7/2008 | Syrjanen et al. |
| 2008/0159507 A1 | 7/2008 | Virolainen et al. |
| 2008/0162127 A1 | 7/2008 | Laaksonen et al. |
| 2010/0074455 A1 | 3/2010 | Frauenthal et al. |
| 2010/0278358 A1 | 11/2010 | Pocino et al. |
| 2012/0069989 A1 | 3/2012 | Lambert |
| 2013/0022217 A1 | 1/2013 | Jeong et al. |
| 2013/0044871 A1 | 2/2013 | O'Donovan |
| 2013/0176910 A1 | 7/2013 | Gorti et al. |

FOREIGN PATENT DOCUMENTS

| | | |
|---|---|---|
| EP | 1868362 A1 | 6/2007 |
| GB | 2329097 A | 10/1999 |

OTHER PUBLICATIONS

Benesty, J. et al., "A Better Understanding and an Improved Solution to the Specific Problems of Stereophonic Acoustic Echo Cancellation" IEEE Trans. on Speech and Audio Processing, vol. 6, No. 2, pp. 156-165, Mar. 1998, retrieved from the Internet: <http://www.sipl.technion.ac.il/new/Teaching/Projects/spring2007/StereoEchoCancellation.pdf>.

Gansler, T. et al., "Multichannel acoustic echo cancellation: what's new?" in Proc. of Int'l. Workshop on Acoustic Echo and Noise Control, IWAENC, 2001, retrieved from the Internet: <www.iwaenc.org/proceedings/2001/main/data/gaenslerkey.pdf>.

U.S. Appl. No. 13/570,697, Non-Final Office Action, Jun. 5, 2014, 7 pg.

U.S. Appl. No. 13/570,697, Non-Final Office Action, Dec. 31, 2014, 5 pg.

U.S. Appl. No. 13/570,697, Final Office Action, Jul. 16, 2015, 7 pg.

U.S. Appl. No. 13/570,697, Notice of Allowance, Jun. 30, 2016, 7 pg.

AUDIO QUALITY IN TELECONFERENCING

CROSS-REFERENCE TO RELATED APPLICATIONS

This application claims the benefit of European Application Number 11177934.4 filed on 18 Aug. 2011, which is fully incorporated herein by reference.

BACKGROUND

A teleconference is the live exchange of information between several persons remote from one another but linked by a telecommunication system. The telecommunications system may support the teleconference by providing one or more of: audio, video, and/or data services. Therefore, the term teleconference is taken to include videoconferences, web conferences, and other forms of mixed media conferences, as well as purely audio conferences.

One of the main problems of achieving a good quality experience in a teleconference is the need to eliminate audio feedback or echo caused by a speaker's own speech being played back to them by the teleconferencing service. Until recently most algorithms worked on the assumption that the only possible path for audio to get from one participant's microphone to another participant's microphone was through being sent to the teleconferencing server and back again (typically with a delay of more than 100-200 milliseconds).

In recent times, however, with cheap network links and computer telephony, it is common for many conference participants to be physically adjacent to each other in a meeting room, but to have separate lines open to the teleconferencing server. In such a situation, it is possible for the person speaking to be picked up by several different microphones. Since each teleconference participant in the same room will also have a speaker playing the sound of the teleconference, the number of potential feedback loops will increase dramatically with each active microphone in the room, which makes good echo cancellation very difficult to achieve.

Current echo cancellation is based upon detecting when the received signal from a microphone contains duplicate copies of the main speech signal which are attenuated and offset by a delay. As there are multiple possible causes of echo, the algorithms deal with the possibility of having multiple different echoes with different delays. The process of detecting and eliminating these echoes is never perfect and risks introducing significant distortion into the speech signal.

BRIEF SUMMARY

According to a first aspect of the present invention there is provided a method for improved audio quality in teleconferencing, including: analyzing an audio signal of multiple input lines in a teleconferencing system using a processor to detect if any two input lines contain substantially the same audio signal with a delay shorter than that of a conventional echo caused by an input line's own audio feedback via a teleconferencing server; and de-selecting the input line with the lower amplitude audio signal or the later received audio signal when two input lines with substantially the same audio signal are detected.

According to a second aspect of the present invention there is provided a system for improved audio quality in teleconferencing, including a processor configured to perform operations. The operations include analyzing an audio signal of multiple input lines in a teleconferencing system to detect if any two input lines contain substantially the same audio signal with a delay shorter than that of a conventional echo caused by an input line's own audio feedback via a teleconferencing server; and de-selecting the input line with the lower amplitude audio signal or the later received audio signal when two input lines with substantially the same audio signal are detected.

According to a third aspect of the present invention there is provided a computer program product for improved audio quality in teleconferencing. The computer program product includes a computer readable storage medium having stored thereon program code that, when executed, configures a processor to perform executable operations. The executable operations include analyzing an audio signal of multiple input lines in a teleconferencing system to detect if any two input lines contain substantially the same audio signal with a delay shorter than that of a conventional echo caused by an input line's own audio feedback via a teleconferencing server; and de-selecting the input line with the lower amplitude audio signal or the later received audio signal when two input lines with substantially the same audio signal are detected.

BRIEF DESCRIPTION OF THE SEVERAL VIEWS OF THE DRAWINGS

Embodiments of the invention will now be described, by way of example only, with reference to the accompanying drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

This embodiments disclosed within this specification relate to the field of teleconferencing. In particular, the embodiments disclosed herein relate to improved audio quality in teleconferencing.

In the following detailed description, numerous specific details are set forth in order to provide a thorough understanding of the embodiments of the invention. However, it will be understood by those skilled in the art that the embodiments of the present invention may be practiced without these specific details. In other instances, well-known methods, procedures, and components have not been described in detail so as not to obscure the embodiments of the present invention.

A method and system are described in which each of the input lines of a teleconferencing system is analyzed to see if a copy of substantially the same audio signal is provided with a delay shorter than that which could be explained by a conventional echo through a media mixer of a teleconferencing server. When input lines with duplicated audio signals are detected, only one of the input lines is used for generating the mixed output.

The time offset between different copies of the audio signal picked up by different microphones in the same room is likely to be less than 5-10 milliseconds since the speakers are likely to be separated by a few meters at most. This means that it should be possible to discriminate between echoes caused by sounds relayed through a media mixer of the teleconferencing server and echoes caused by multiple lines being open into the teleconference that are physically adjacent to each other.

If more than one microphone at the same location picks up a speaker's voice, the input lines from the microphones will contain substantially the same audio signal, although the audio signals may have different amplitudes or may have slight delays.

The solution is to have a different strategy for dealing with echo cancellation for copies of the speech signal which have a shorter delay than conventional echo feedback through a media mixer. In this case, the best strategy is for the media mixer to select only one of the microphones at a given location to make active.

When a different person in the room begins speaking, the best choice for which microphone to make active will change. However, any delay in switching between active microphones is unlikely to cause anything said to be lost because the speech will be picked up by the other microphone in the room (although at a slightly lower quality because the microphone is more distant from the active speaker).

Figure 1:
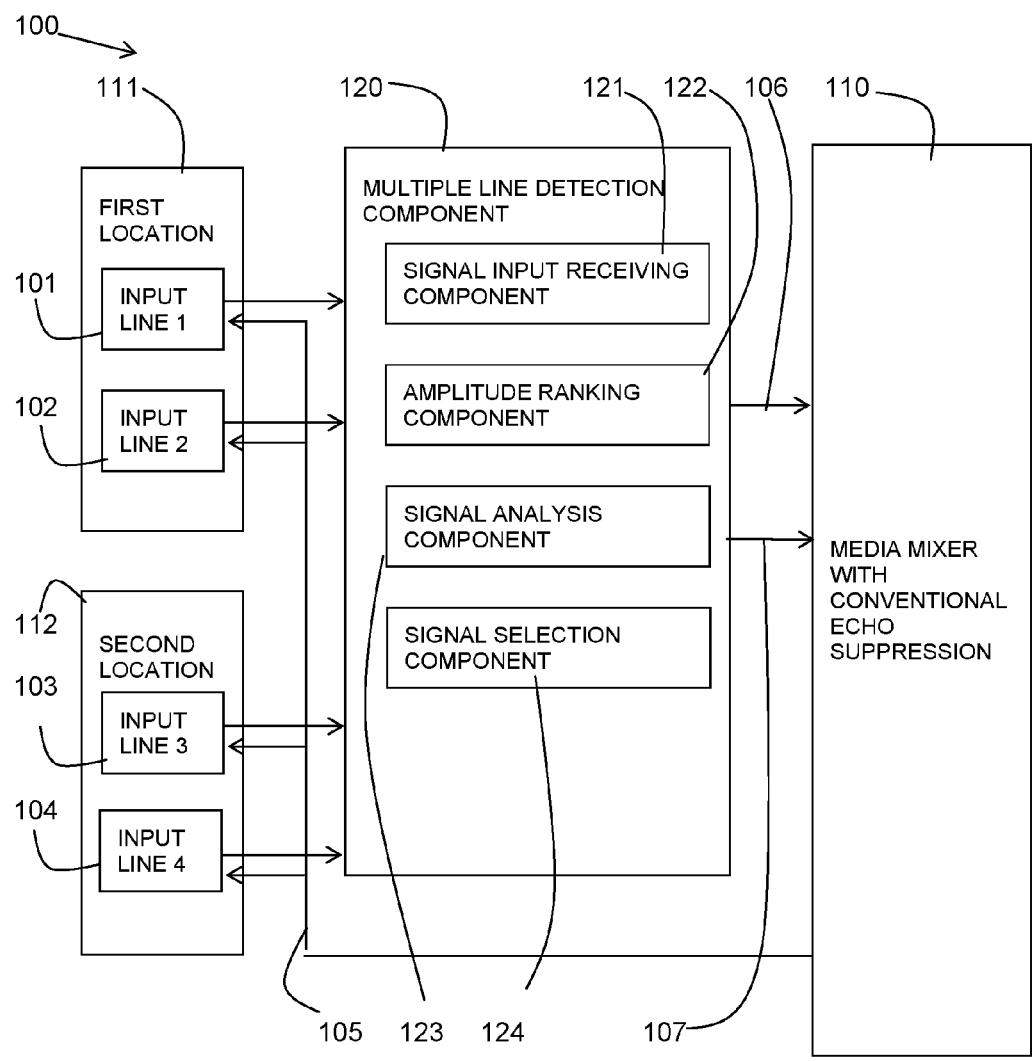
FIG. 1 is a block diagram of an embodiment of a system in accordance with a preferred embodiment of the present invention.

Referring to FIG. 1, a block diagram shows an embodiment of the described teleconferencing system 100. Multiple input lines 101-104 are provided in a teleconferencing system 100. The input lines 101-104 may each be from individual participant locations (one line only from the location) or from multiple-participant locations (more than one line from the location). In the example embodiment of FIG. 1, multiple input lines 101-102 may come from a first single location 111 such as a meeting room in a first location, for example, Dublin, and other multiple input lines 103-104 may come from a second single location 112 such as a meeting room in a second location, for example, New York.

A media mixer 110 of a teleconferencing server which provides the teleconferencing service produces a composite mixed signal 105 to be played back to all participants, which consists of a mixture of input lines where sound is detected.

The media mixer 110 may include a conventional echo suppression component for suppression of audio feedback or echo caused by a participant's own speech being played back to them from the teleconferencing server. Conventional echo suppression works by looking to see if any of the input lines contain a copy of the output that has been both delayed and attenuated. If this happens this is corrected by attempting to subtract the echo from the main signal.

In the described system 100, a multiple line detection component 120 is provided to detect if multiple input lines 101-104 are coming from the same location and to select lines to be provided to the media mixer 110. In the example embodiment of FIG. 1, one input line 106, 107 from each location 111, 112 is provided to the media mixer 110, for example, either input line 101 or 102 and either input line 103 or 104.

The multiple line detection component 120 may include a signal input receiving component 121 for receiving and determining an amplitude of a signal received from each input line 101-104 averaged over a short time period (for example, averaged over 100 milliseconds) which would be too short to contain any echo generated by a signal which travels from the speaker to the teleconferencing server and back again.

The multiple line detection component 120 may also include an amplitude ranking component 122 for ranking the input lines 101-104 based upon the amplitude of the signal received from them over a previous time period, (for example, over a last 100 milliseconds). In most systems, a time period greater than 10 milliseconds is sufficient to allow detection of local duplicates and any period less than 200 milliseconds can be safely selected without risking accidentally picking up echoes that are generated by the signals travelling through the teleconferencing server.

The multiple line detection component 120 may also include a signal analysis component 123 for analyzing the signals in order of strength with relation to the other input line's signals. The analysis component 123 may ascertain if any of the signals are substantially correlated with the strongest input. A signal selection component 124 may be provided to ignore or de-select a weaker correlated signal when providing the input signals to the media mixer 110.

A mixed output signal component of the media mixer 110 may be provided for producing the mixed output signal 105 and outputting this to the participants. In the example of FIG. 1, since the multiple line detection unit 120 will have detected that two of the input lines are duplicates, the mixed output signal 105 need only be generated from two lines rather than four lines which simplifies the mixing task and is likely to increase the quality of the output.

Figure 2:
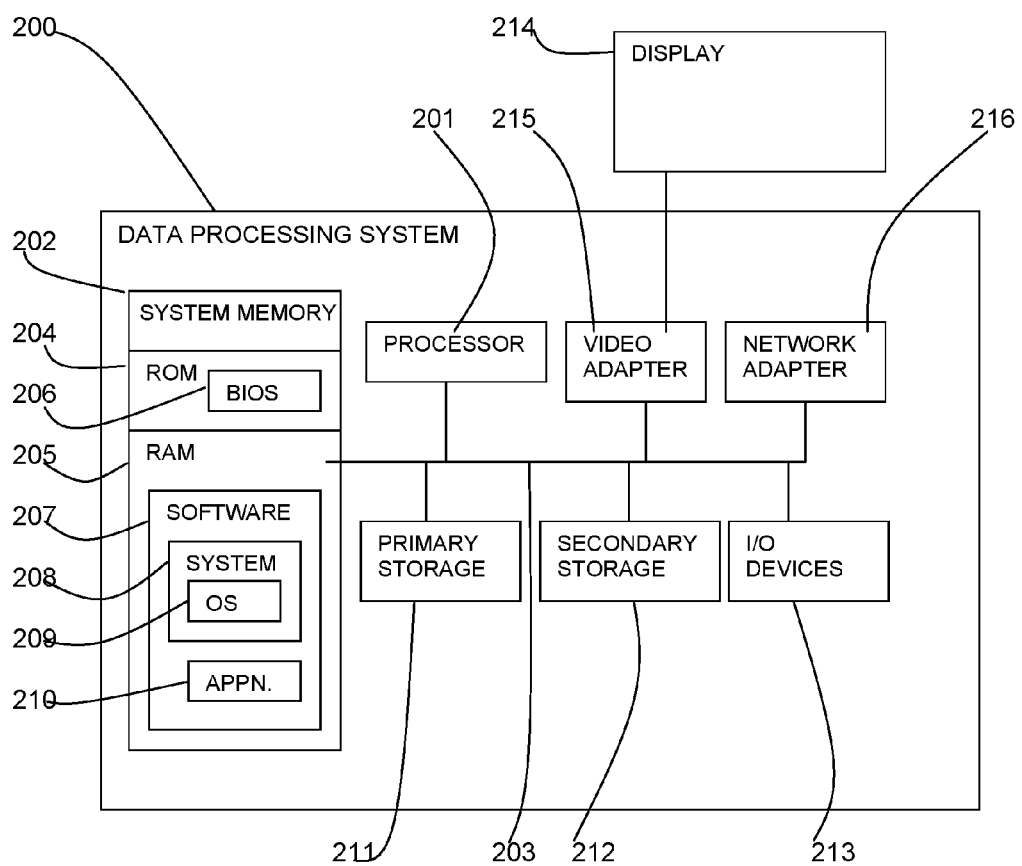
FIG. 2 is a block diagram of a computer system in which a preferred embodiment of the present invention may be implemented.

Referring to FIG. 2, an exemplary system for implementing aspects of the invention includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 202 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 212.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
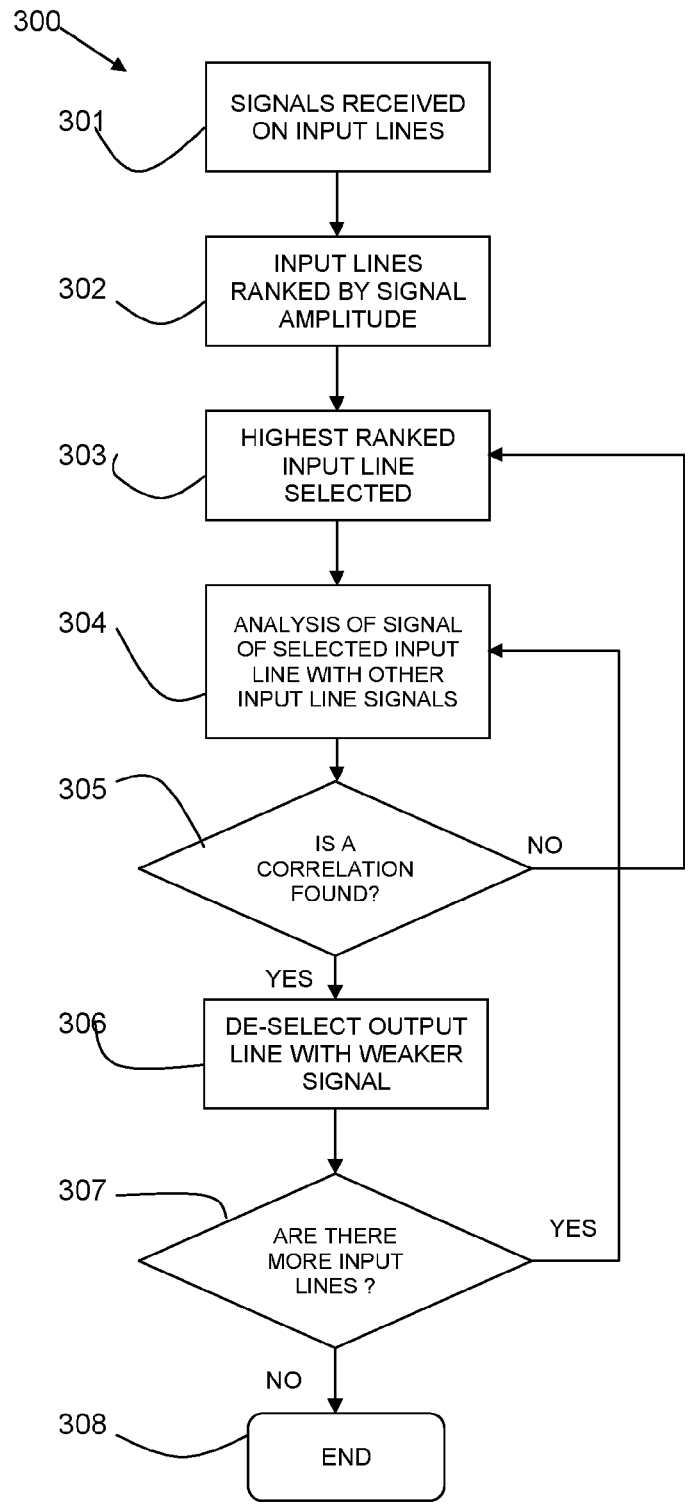
FIG. 3 is a flow diagram of an embodiment of a method in accordance with a preferred embodiment of the present invention.

Referring to FIG. 3, a flow diagram 300 shows an embodiment of the described method.

Signals may be received 301 on input lines at a multiple line detection component. The input lines may be ranked 302 based upon the amplitude of the signal received from them over a last time period, for example, over the last 100 milliseconds.

The highest ranked input line may be selected 303, and the method may analyze 304 the signal coming from each of the other input lines to see if it is substantially correlated with the strongest input. It may be determined 305 if a correlation is found. If there is no correlation, the next strongest signal line may be selected 303 for analysis.

If a correlation is found, then the weaker signal may be ignored and de-selected 306 when producing a mixed output signal.

It may then be determined 307 if there are one or more input lines left. If there are one or more input lines left, the method may loop to repeat from the analysis step 303 to see if any of the remaining input lines are also duplicates. If there are no input lines left, the method ends 308.

The selected input line or lines may be input to a media mixer with conventional echo suppression which may mix the input signals to generate a single output signal. The single output signal is delivered to each participant in the teleconference.

In an alternative embodiment of the described method and system, instead of determining a highest amplitude signal coming from a location, a first of duplicated signals to arrive is selected (or later signals are de-selected) for the mixed output signal. This may be useful if a speaker's microphone is less efficient than another participant's microphone at the same location.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Embodiments of the invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

What is claimed is:

1. A computer-implemented method, comprising:
   analyzing, using a hardware processor, audio signals from each of first and second input lines in a teleconferencing system;
   determining that the audio signals from first and second input lines contain a substantially same portion;
   determining that the substantially same portion of the first input line is not an echo of the substantially same portion of the second input line; and
   de-selecting, of the first and second input lines, an input line with a lower amplitude audio signal or a later received audio signal.

2. The method of claim 1, wherein
   the determination that the substantially same portion is not an echo is based upon a delay between the substantially same portions of the first and second input lines being less than an expected echo-caused delay.

3. The method of claim 2, wherein
   the delay is less than 100 milliseconds.

4. The method of claim 2, wherein
   the first and second inputs lines are ranked based upon an amplitude of each input line over a period of time.

5. The method of claim 4, wherein
   the period of time is a last period of between 10 milliseconds and 200 milliseconds.

6. The method of claim 1, wherein
   the analyzing is performed upon a new speaker being detected.

7. A computer hardware system, comprising:
   a hardware processor configured to initiate the following executable operations:
      analyzing audio signals from each of first and second input lines in a teleconferencing system;
      determining that the audio signals from first and second input lines contain a substantially same portion;
      determining that the substantially same portion of the first input line is not an echo of the substantially same portion of the second input line; and
      de-selecting, of the first and second input lines, an input line with a lower amplitude audio signal or a later received audio signal.

8. The system of claim 7, wherein
   the determination that the substantially same portion is not an echo is based upon a delay between the substantially same portions of the first and second input lines being less than an expected echo-caused delay.

9. The system of claim 8, wherein
   the delay is less than 100 milliseconds.

10. The system of claim 8, wherein
    the first and second inputs lines are ranked based upon an amplitude of each input line over a period of time.

11. The system of claim 10, wherein
    the period of time is a last period of between 10 milliseconds and 200 milliseconds.

12. The system of claim 7, wherein
    the analyzing is performed upon a new speaker being detected.

13. A computer program product, comprising:
    a storage hardware device having stored thereon program code
    the program code, which when executed by a computer hardware system, causes a computer hardware system to perform:
       analyzing audio signals from each of first and second input lines in a teleconferencing system;

determining that the audio signals from first and second input lines contain a substantially same portion;

determining that the substantially same portion of the first input line is not an echo of the substantially same portion of the second input line; and de-selecting, of the first and second input lines, an input line with a lower amplitude audio signal or a later received audio signal.

14. The computer program product of claim 13, wherein the determination that the substantially same portion is not an echo is based upon a delay between the substantially same portions of the first and second input lines being less than an expected echo-caused delay.

15. The computer program product of claim 14, wherein the delay is less than 100 milliseconds.

16. The computer program product of claim 14, wherein the first and second inputs lines are ranked based upon an amplitude of each input line over a period of time.

17. The computer program product of claim 16, wherein the period of time is a last period of between 10 milliseconds and 200 milliseconds.

18. The computer program product of claim 13, wherein the analyzing is performed upon a new speaker being detected.

\* \* \* \* \*